United States Patent
Jeyanandarajan

(10) Patent No.: US 11,227,505 B2
(45) Date of Patent: Jan. 18, 2022

(54) SYSTEMS AND METHODS FOR CUSTOMIZING A LEARNING EXPERIENCE OF A USER

(71) Applicant: Dhiraj Jeyanandarajan, Irvine, CA (US)

(72) Inventor: Dhiraj Jeyanandarajan, Irvine, CA (US)

(*) Notice: Subject to any disclaimer, the term of this patent is extended or adjusted under 35 U.S.C. 154(b) by 0 days.

(21) Appl. No.: 17/081,637

(22) Filed: Oct. 27, 2020

(65) Prior Publication Data

US 2021/0043102 A1 Feb. 11, 2021

Related U.S. Application Data

(63) Continuation of application No. 16/276,741, filed on Feb. 15, 2019, which is a continuation of application
(Continued)

(51) Int. Cl.
| | |
|---|---|
| *G09B 7/08* | (2006.01) |
| *G09B 5/06* | (2006.01) |
| *H04L 29/06* | (2006.01) |
| *H04L 29/08* | (2006.01) |
| *G06F 21/32* | (2013.01) |
| *G09B 19/02* | (2006.01) |

(52) U.S. Cl.
CPC .............. *G09B 7/08* (2013.01); *G06F 21/32* (2013.01); *G09B 5/06* (2013.01); *G09B 19/02* (2013.01); *H04L 63/0861* (2013.01); *H04L 67/22* (2013.01); *H04L 67/2823* (2013.01); *H04L 67/306* (2013.01); *G06F 2221/2101* (2013.01)

(58) Field of Classification Search
CPC ... G09B 7/00; G09B 7/08; G09B 5/00; G09B 5/02; G09B 5/04; G09B 5/06; G09B 19/02; G06F 21/32; G06F 2221/2101; H04L 63/08; H04L 63/0861; H04L 67/28
See application file for complete search history.

(56) References Cited

U.S. PATENT DOCUMENTS

| 5,978,648 A | 11/1999 | George |
| 2003/0207237 A1 | 11/2003 | Glezerman |

(Continued)

FOREIGN PATENT DOCUMENTS

WO 2014107795 7/2014

OTHER PUBLICATIONS

Heraz, Alicia, et al., "Predicting the Three Major Dimensions of the Learner's Emotions from Brainwaves", World Academy of Science, Engineering and Technology International Journal of Computer and Information Engineering, vol. 1, No. 7, 2007, pp. 1994-2000.
(Continued)

*Primary Examiner* — Timothy A Musselman
(74) *Attorney, Agent, or Firm* — Sheppard Mullin Richter & Hampton LLP

(57) ABSTRACT

Systems and methods for customizing an educational interactive multimedia presentation based on biometric sensor readings of a user. The interactive multimedia presentation may include one or more educational lessons that are presented to the user. A particular educational lesson may include content related to one or more skillsets the user is learning. By adapting the interactive multimedia presentation based on the user's biometric sensor readings, a customized learning experience may be created for the user.

20 Claims, 7 Drawing Sheets

Related U.S. Application Data

No. 15/882,046, filed on Jan. 29, 2018, now Pat. No. 10,210,768, which is a continuation of application No. 14/474,036, filed on Aug. 29, 2014, now Pat. No. 9,881,512.

(56) References Cited

U.S. PATENT DOCUMENTS

| | | |
|---|---|---|
| 2005/0080592 A1 | 4/2005 | Buscema |
| 2008/0275358 A1 | 11/2008 | Freer |
| 2009/0062660 A1 | 3/2009 | Chance |
| 2009/0221928 A1 | 9/2009 | Einav |
| 2009/0265649 A1 | 10/2009 | Schlossberg |
| 2009/0319459 A1 | 12/2009 | Breazeal |
| 2010/0004977 A1 | 1/2010 | Marci |
| 2010/0274835 A1 | 10/2010 | Brown |
| 2011/0091847 A1 | 4/2011 | Carroll |
| 2011/0105859 A1 | 5/2011 | Popovic |
| 2012/0040326 A1 | 2/2012 | Larson-Rutter |
| 2013/0177883 A1 | 7/2013 | Bamehama |
| 2013/0179087 A1 | 7/2013 | Garripoli |

OTHER PUBLICATIONS

Petrantonakis, Panagiotis C., et al., "Emotion Recognition from Brain Signals Using Hybrid Adaptive Filtering and Higher Order Crossings Analysis", IEEE Transactions on Affective Computing, vol. 1, No. 2, Jul.-Dec. 2010, 17 pages.

Yuen, Chai Tong, et al., "Classification of Human Emotions from EEG Signals using Statistical Features and Neural Network", International Journal of Integrated Engineering (Issue on Electrical and Electronic Engineering), 2010, 6 pages.

800

Effectuate presentation of an educational interactive multimedia presentation to a user
802

Obtain information related to recorded biometric sensor readings of the user
804

Determine a parameter value associated with a learning state parameter of the user
806

Determine one or more modifications
808

SYSTEMS AND METHODS FOR CUSTOMIZING A LEARNING EXPERIENCE OF A USER

CROSS-REFERENCE TO RELATED APPLICATIONS

This application is a continuation of U.S. patent application Ser. No. 16/276,741, filed Feb. 15, 2019, entitled "SYSTEMS AND METHODS FOR CUSTOMIZING A LEARNING EXPERIENCE OF A USER", which is a continuation of U.S. patent application Ser. No. 15/882,046, filed Jan. 29, 2018, entitled "SYSTEMS AND METHODS FOR CUSTOMIZING A LEARNING EXPERIENCE OF A USER" (which issued as U.S. Pat. No. 10,210,768 on Feb. 19, 2019), which is a continuation of U.S. patent application Ser. No. 14/474,036, filed Aug. 29, 2014, entitled "SYSTEMS AND METHODS FOR CUSTOMIZING A LEARNING EXPERIENCE OF A USER" (which issued as U.S. Pat. No. 9,881,512 on Jan. 30, 2018), which are hereby incorporated herein by reference in their entirety.

FIELD OF THE DISCLOSURE

This disclosure relates to systems and methods for customizing an interactive multimedia presentation based on biometric sensor readings of a user, wherein the customizations are configured to elicit brain activity of the user to match predetermined brain activity of an expert control user.

BACKGROUND

Adaptive learning programs are programs that offer different educational content to learners based on an assessment of the learner. The assessment parameters vary from program to program as does the educational content, so not all adaptive programs are the same. For example, if a learner is struggling to complete a particular task, the program may dynamically adapt by changing the task to match the leaners abilities. Done correctly, adaptive learning programs may show improvements in educational settings.

SUMMARY

One aspect of the disclosure relates to a system for customizing an educational interactive multimedia presentation using biometric sensor readings of a user. The interactive multimedia presentation may include both educational content and non-educational content. For example, the educational content of the interactive multimedia presentation may include educational lessons that are presented to the user. The non-educational content may include one or more of background and/or foreground color, brightness, imagery, motion, music and/or other sound, touch reactive interface components, and/or other considerations. Customizations to the interactive multimedia presentation may include one or more modifications to the non-educational content based on the biometric sensor readings (e.g., brain activity via electroencephalography (EEG) data, and/or other considerations), such that the educational content is otherwise unchanged. The modification(s) may be specifically determined to elicit neural activation and/or neuroplasticity in the user such that the user's brain may behave the same as or similar to an expert control user during the learning process. As a result, a customized learning experience may be dynamically created for the user.

As an illustrative example, if a lesson is a counting lesson that displays numbers that a user must select in sequential order, a modification may include a change to a background color presented during the lesson, and/or other considerations. In other words, the modification does not include a change to the presented numbers themselves, such that the content of the lesson remains the same. The modifications may be specifically determined to elicit neural activation and/or neuroplasticity in the user such that the user's brain may behave the same as or similar to a control user undergoing the same or similar counting lesson. Accordingly, aspects such as user attention level, information that is being retained, comprehension of the material being presented, and/or overall learning performance by the user may be dramatically improved over the course of one or more lessons.

The system may include one or more biometric sensors operatively coupled to or included with the client computing platform. In some embodiments, the biometric sensors may be configured to generate sensor readings conveying information related to the cognitive state, brain activity, and/or other information related to the user. Brain activity monitoring and/or recording may be accomplished via electroencephalography (EEG) (e.g., using an EEG headset and/or other components), functional magnetic resource imaging (fMRI), and/or by other technique(s).

In some implementations, the interactive multimedia presentation may be presented via a virtual reality (VR) platform (and/or other display platform) that is operatively coupled to or included at the client computing platforms, and/or other considerations. For example the client computing platforms may be coupled with VR goggles, another display and/or presentation component, other interactive components, and/or other considerations.

The system may include a server including one or more physical processors. The processors may be configured to execute one or more computer program components. The computer program components may include one or more of a presentation component, a sensor readings component, a learning parameter component, a modification component, an evaluation component, and/or other components.

In some implementations, the presentation component may be configured to effectuate presentation of the interactive multimedia presentation to the user. The interactive multimedia presentation may be presented through views generated by the client computing platform associated with the user. For example, the one or more processors may communicate with the client computing platform via client/server architecture, and/or other considerations. The user may participate in the interactive multimedia presentation through user input, and/or other considerations. The user input may be facilitated through entry and/or selection by the user via the client computing platform. For example, the client computing platform may include one or more of a touchscreen interface, keyed input mechanisms (e.g., a keyboard), a controller (e.g., a remote control, game controller, and/or other considerations) and/or other components configured to receive user input.

The content of the interactive multimedia presentation may include lessons and/or exercises designed to teach one or more skillsets (e.g., mathematical lessons, reading lessons, language lessons, age-appropriate lessons, and/or other considerations). In some implementations, the content of the interactive multimedia presentation may be presented in the form of a slideshow, a lecture, and interactive game, and/or other considerations. The lessons may include one or more aspects and/or components that may not be associated with the educational content presented in a given lesson. For example, the interactive multimedia presentation may include non-educational related aspects such as a visual component (e.g., color, brightness, pattern, motion, background imagery, and/or other considerations), auditory components (e.g., an audible tone, background music, pitch, tone, melody, prosody, volume, and/or other considerations), tactile kinesthetic components (e.g., touch reactive interface components, proprioception, vibration, and/or other considerations) and/or other aspects and/or components. However, the educational content portions of the interactive multimedia presentation may also be associated with a visual component, auditory components, tactile kinesthetic components, and/or other components.

In some implementations, the aspects and/or components of the interactive multimedia presentation related to the non-educational content may be categorized and/or given a quantitative and/or qualitative value based on control values. In some implementations, the control values may be derived from the level of (neural) activation and/or neuroplasticity each aspect and/or component in isolation causes and/or elicits in the user (e.g., as measured by EEG, fMRI, and/or other technique). The categorization and/or value of the aspects and/or components may be used, at least in part, for determining customization (e.g., modifications) to the interactive multimedia presentation.

The sensor readings component may be configured to obtain information from the client computing platform associated with the user. The obtained information may include information related to biometric sensor readings of the user. In some implementations, the obtained information may include the biometric sensors readings themselves, descriptions of one or more cognitive states of the user during the participation in the interactive multimedia presentation, and/or other information.

The learning parameters component may be configured to determine one or more parameter values associated with a learning state parameter of the user. The learning state parameter may reflect one or more relative cognitive states of the user during interaction with a lesson. For example, the learning state parameter may correspond to one or more of the user's attention level during participation, cognitive workload, specific regions of brain activity, the overall receptivity of the user to the content presented in the lesson, the user's ability to retain and/or master a particular skillset, and/or other aspect, as it relates to the control user. The parameter value may reflect a relative current state these one or more of these elements, presented in more detail herein.

In some implementations, the biometric sensor readings may include and/or otherwise facilitate brainwave activity monitoring and/or recording in real time, or near real time, as the user interacts with the interactive multimedia presentation. The cognitive states of the user may be derived and/or otherwise determined based on the brainwave activity monitoring and/or other biometric sensor reading and/or measurement, and/or may be determined in other ways.

In some implementations, one or more target cognitive states may be classified and/or otherwise determined for each lesson and/or each user participating in the interactive multimedia presentation. The target states may correspond to cognitive states that provide a benchmark and/or desired cognitive learning state of the user while learning one or more skillsets. For example, the target states may be an optimal cognitive state for learning, and/or other considerations. The target states may be indicative of, for example, an increase and/or improvement in proficiency of the user in the one or more skillsets, improved and/or increased information retention via long term memory activation, heightened attention levels, and/or other considerations. The target states may be associated with a particular engagement level, a particular cognitive workload, specific brain region(s) that are activated (and/or patterns of activation), and/or other considerations.

In some implementations, the target states may be derived from biometric sensor readings of control users that have participated in, or are concurrently participating in, the interactive multimedia presentation. The control users may be individuals that demonstrate mastery of the content (e.g., the skillset) presented in the interactive multimedia presentation, and/or other considerations. For example, the control users may be experts in the field related to a skillset, and/or other considerations (e.g., for a math lesson, the control user may be a mathematician, and/or other considerations). It is noted that the terms "target state" and/or "target learning state" may herein also be referred to as "cognitive criteria", "predetermined cognitive criteria", and/or other considerations.

In some implementations, the learning parameter component may be configured to determine the one or more parameter values of the learning state parameter based on comparison(s) between the cognitive state(s) of the user and the predetermined cognitive criteria. In some implementations, the parameter values may be determined in real time, or near real time, as the user interacts with a particular lesson, a portion of a particular lesson, and/or other considerations. In some implementations, real time brainwave activity may be compared and/or otherwise evaluated with respect to the cognitive criteria for each lesson and/or for different parts of each lesson. The comparison may include mapping a difference between brainwave activity of the user as it relates to one or more of the attention, cognitive workload, spatial activation, and/or other aspect of to the user's cognitive state and the cognitive criteria (e.g., brainwave activity of the control user as it relates to attention level, cognitive workload, spatial activation, and/or other aspect of to the control user's cognitive state, and/or other considerations), and/or may include one or more other evaluations and/or comparisons.

In some implementations, the modification component may be configured to determine one or more modifications to the interactive multimedia presentation based on the determined parameter value(s). The modification component may be configured to effectuate the determined modification(s) in real time, or near real time. The one or more modifications may include a change to one or more of the visual component, auditory component, tactile component, and/or other component of the interactive multimedia presentation (e.g., for a given lesson, part of a give lesson, and/or other considerations).

The evaluation component may be configured to evaluate the user's learning progress, and/or other considerations. In some implementations, evaluating the user's learning progress may include implementing one or more evaluation stages into the interactive multimedia presentation at various stages. These evaluation stages may include games, mini-games, exercises, question and answer portions, simulated exploratory learning environments, and/or other considerations. An initial evaluation stage may be implemented at the beginning of a lesson to determine a base knowledge level of the user prior to the start of the lesson, and/or other considerations. Evaluation stages may be implemented periodically during the presentation of the interactive multimedia presentation. The evaluation states may be employed to determine progressive knowledge levels related to the user's ongoing comprehension of the specific concept and/or skillset being taught.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
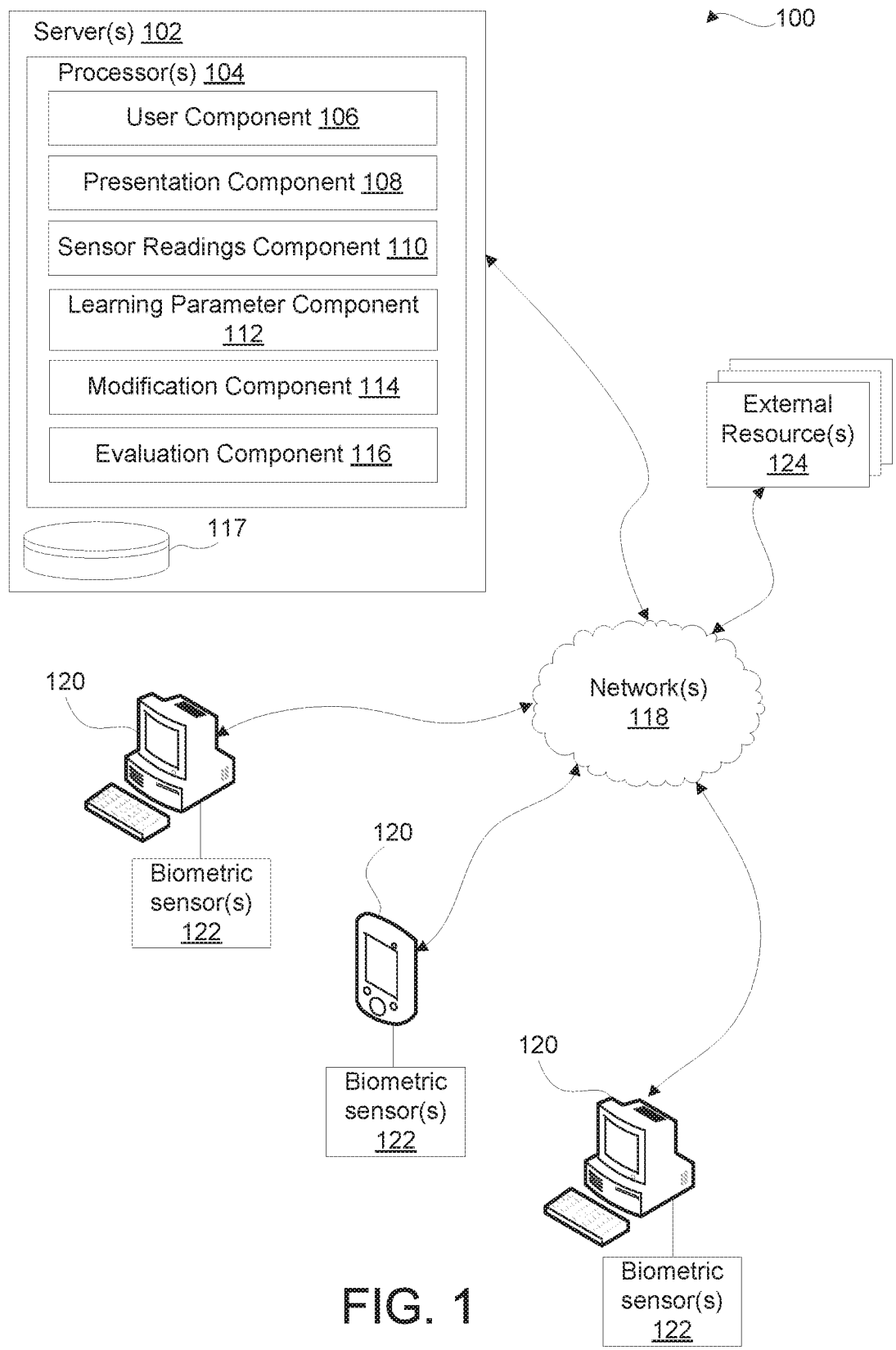
FIG. 1 illustrates a system for customizing an interactive multimedia presentation, in accordance with one or more implementations.

FIG. 1 illustrates a system 100 for customizing an educational interactive multimedia presentation. In some implementations, the customization may include modifications to educational lessons presented in the interactive multimedia presentation. The modifications include changes to non-educational content of the lessons to elicit brain activity in the user such that the may be in a target cognitive state for learning. The modifications may result in the presentation of key learning concepts while the user is in the target cognitive state to create a customized learning experience for the user. The target cognitive state may be related to one or more of an attention level, cognitive workload, particular brain activity and/or patterns of activity, receptivity of the user, and/or other considerations.

In some implementations, the interactive multimedia presentation may take place in a virtual space, and/or other considerations. In some implementations, the virtual space may include a video game that takes place within the virtual space. In some implementations, the interactive multimedia presentation may comprise the video game taking place in the virtual space. Users (e.g., not shown in FIG. 1) may participate in the interactive multimedia presentation, virtual space, and/or video game via client computing platforms 120 associated with the users. For example, a given user may participate in the interactive multimedia presentation, virtual space, and/or video game through input facilitated through entry and/or selection by the user via a client computing platform 120 associated with the user. The client computing platforms 120 may include electronic devices, mobile electronic devices, and/or other considerations. For example the client computing platforms 120 may include PDAs, cellular telephones, smart phones, laptops, tablets, desktop computers, PC's, and/or other devices.

The client computing platforms 120 may include one or more biometric sensors 122 that are coupled with and/or included at the client computing platforms 120. The biometric sensors 122 may include for example, one or more of an electroencephalogram (EEG) sensor (e.g., a headset and/or other considerations), a body temperature sensor, a galvanic skin response sensor, a heart rate sensor, an eye tracking sensor, functional magnetic resonance imaging device (fMRI), transcranial Doppler, magnetoencephalogram, and/or other considerations.

The client computing platforms 120 may include and/or be coupled with one or more input devices, output devices, and/or other components. For example, input devices may include one or more of a keyboard, a mouse, a touchscreen interface, a remote controller, a video game controller (e.g., joystick), and/or other considerations. Output devices may include one or more of a display, a screen, a touchscreen interface, virtual reality platform (e.g., VR goggles and/or other considerations), tactile feedback components, a monitor, and/or other considerations.

Providing the interactive multimedia presentation may include hosting the interactive multimedia presentation over a network 118, such as the Internet and/or other network. A host server 102 may include one or more processors 104 configured to execute one or more computer components. The execution of the computer program components may implement an instance of the interactive multimedia presentation to facilitate the participation of one or more users in the interactive multimedia presentation.

As presented herein, the content of the interactive multimedia presentation may include lessons and/or exercises designed to teach one or more skillsets (e.g., mathematical lessons, reading lessons, music lessons, language lessons, age-appropriate lessons, and/or other considerations). Herein the terms "skillsets" and "topics" may be used interchangeably. In some implementations, the content of the interactive multimedia presentation may be presented in the form of a slideshow, a lecture, an interactive game within a virtual space, and/or other considerations. The lessons may include one or more aspects and/or components that may or may not be associated with educational content presented in a given lesson. For example, the interactive multimedia presentation may include non-educational related aspects such as a visual component (e.g., color, brightness, background pattern, motion, background imagery, and/or other considerations), auditory components (e.g., audible tones, music, pitch, tone, melody, prosody, volume, and/or other considerations), tactile kinesthetic components (e.g., touch reactive interface components, proprioception, vibration, and/or other considerations) and/or other aspects and/or components. However, the educational content portions of the interactive multimedia presentation may also be associated with a visual component, auditory components, tactile kinesthetic components, and/or other components, describe in more detail herein.

In some implementations, a given lesson (e.g., educational content) may be associated with one or more lesson "modules". In general, the lessons themselves may be related to a broad learning category and/or skillset (e.g., mathematics). The lesson modules may be considered as types of subcategories within the lessons that may break down the lesson into different targeted concepts. For example, the modules may include different targeted concepts; however, the modules together may build to teach the lesson. Any given lesson may include any number of modules deemed suitable to teach a user the broader category of the lesson. For example, a given lesson may include between 1-20 (other amount) individual modules, and/or other considerations.

In some implementations, described in more detail herein, the modules may be divided into submodules. For example, submodules may include "learning", "fluency", and/or other submodules. Briefly, a "learning" submodule may be associated with content presented to the user that is instruction based, includes explanations, work through examples, and/or includes other content that provides a technique to introduce a particular skillset and/or learning category to a user. The "fluency" submodules may include content that is used to demonstrate proficiency of the user with that topic and/or skillset. For example, the "fluency" submodules may be associated with content that is provided to the user after the user has completed the "learning" submodules. In other words, the "fluency" submodules may include content that is more difficult, abstract, and/or presented differently than content presented in accordance with a "learning" submodule.

Figure 4:
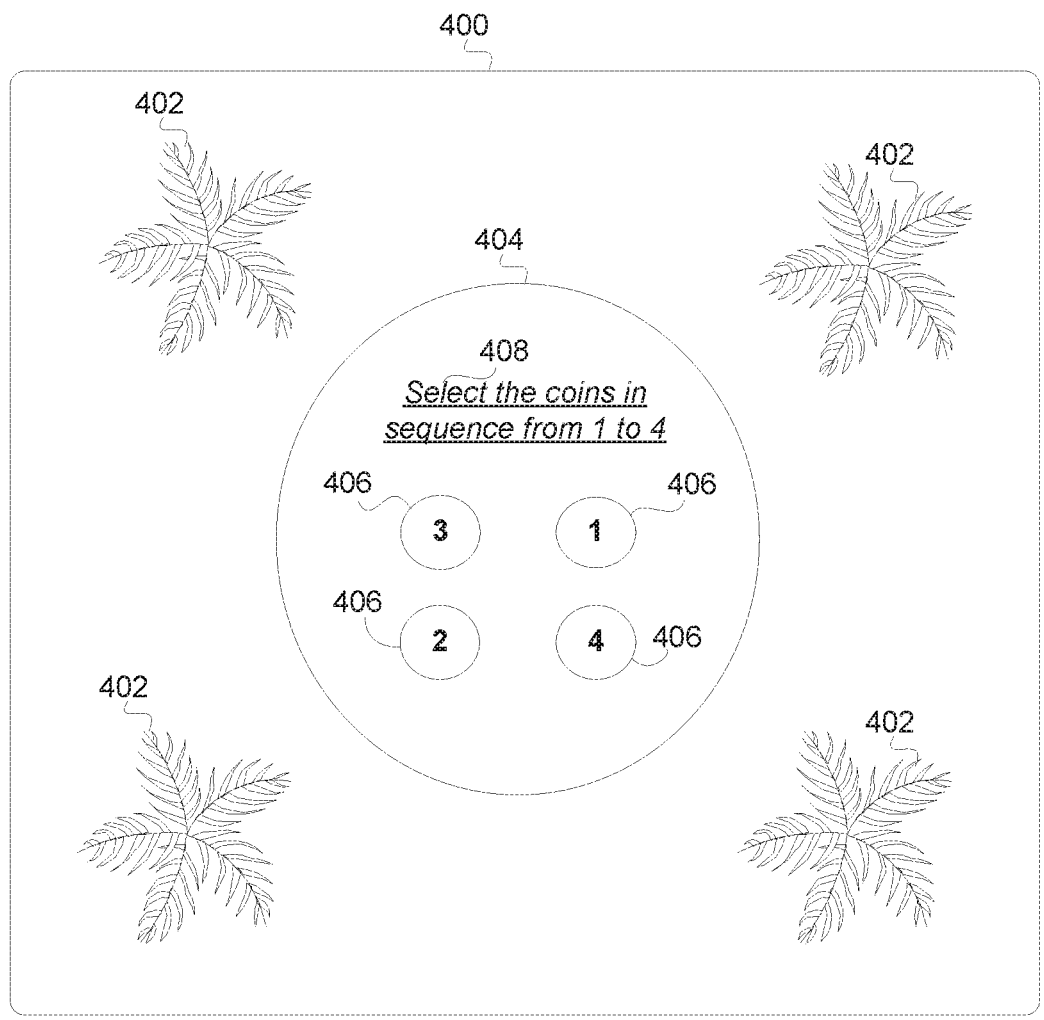
FIG. 4 illustrates an implementation of a lesson presented on a user interface.

As an illustrative example in FIG. 4, an implementation of a user interface 400 depicting content associated with a lesson (e.g., a module and/or submodule) is shown. In the current example, a lesson on counting is depicted. The educational content may be highlighted by a lesson portion 404 (e.g., used to guide the users attention to the elements of the lesson associated with a particular topic, and/or other considerations). The user may be instructed 408 to select interface elements 406 (depicted as coins), having indicia representing the numbers 1 through 4, in sequential order. Thus the lesson may be associated with teaching number recognition, counting, and/or other considerations. It is noted that the "counting" example is provided merely for illustrative purposes only and is not to be considered limiting. Other topics, categories, and/or skillsets may be taught in a lesson and/or may be presented in other ways. For example, more complex mathematical topics may be employed (e.g., FIG. 5 and FIG. 6).

Continuing with the present example, the content displayed may be associated with one or more of a visual component, auditory component, tactile kinesthetic component, and/or other component. Some of the components may be specifically related to the lesson (e.g., educational content), while some of the components may be unrelated to the lesson (e.g., non-educational content). In particular, a visual component associated with the educational content may include one or more of the instructions 408, the indicia depicting values (e.g., 1 through 4) on the interface elements 406, and/or other considerations. In some implementations, an auditory component may be associated with the educational content. For example, verbal instructions, hints, clues, guidance, and/or other audio content may be provided to the user through the client computing platform.

In some implementations, components of the lesson may be associated with non-educational content. A visual component associated with the non-educational content of the lesson may include one or more of the background and/or foreground color (not shown), static or moving background and/or foreground imagery, the shape and/or color of the interface elements 406, and/or other considerations. For example, the lesson may include a display of background and/or foreground elements 402, currently depicted as trees. However, in other implementations, the background may portray a scene (e.g., a natural and/or manmade landscape), an image, and/or other considerations. One or more of the background and/or foreground elements 402 may be static. One or more of the background and/or foreground elements 402 may be moving (e.g., the trees may sway back and forth). It is noted that the position and quantity of the elements 402 is merely illustrative and not to be considered limiting. For example, in other implementations, the quantity and/or positioning of the background and/or foreground elements 402 may be different, and/or the elements may depict different objects, and/or other considerations. An auditory component associated with non-educational content of the lesson may include background sounds such as music, rhythms, and/or other considerations. A tactile component associated with non-educational content may include a vibration effectuated in the client computing platform by virtue of user selection of the one or more interface elements 406. For example, the user interface 400 may be a touchscreen interface, wherein user selection of an interface element 406 causes the client computing platform or other component to vibrate through one or more suitable mechanism included with or coupled to the client computing platform.

In some implementations, the aspects and/or components of the interactive multimedia presentation that are related to non-educational content may be categorized and/or given a quantitative and/or qualitative value based on control values. In some implementations, the control values may be derived from the level of (neural) activation and/or change each aspect and/or component in isolation causes or elicits in the user (e.g., as measured by EEG, fMRI, and/or other technique). In other words, the control values may reflect a level of neuroplasticity that may be elicited in the users.

It is noted that the differentiation between the educational and non-educational content may be that any modifications to the non-education content may not affect and/or otherwise alter the underlying lesson, while changes to the educational content may change the lesson itself. For example, a change to the instructions 408, indicia presented on the interface elements 406, and/or other educational content may in fact change the lesson (e.g., a change in the numbers presented may require the user to count differently and/or recognize different numbers), and/or other considerations. In contrast, a change to the background imagery may not affect the educational content of the lesson (e.g., the elements 402 may be changed from "trees" to "animals", static to moving, and/or other change without affecting the lesson of counting from 1 to 4) and/or other considerations.

Figure 5:
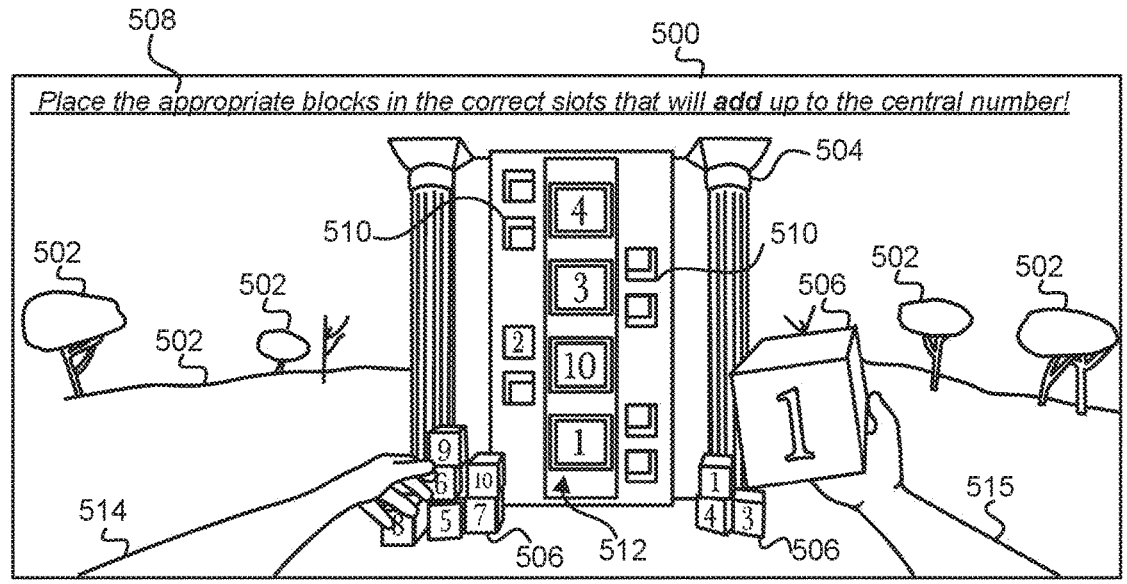
FIG. 5 illustrates another implementation of a lesson presented on a user interface.
Figure 6:
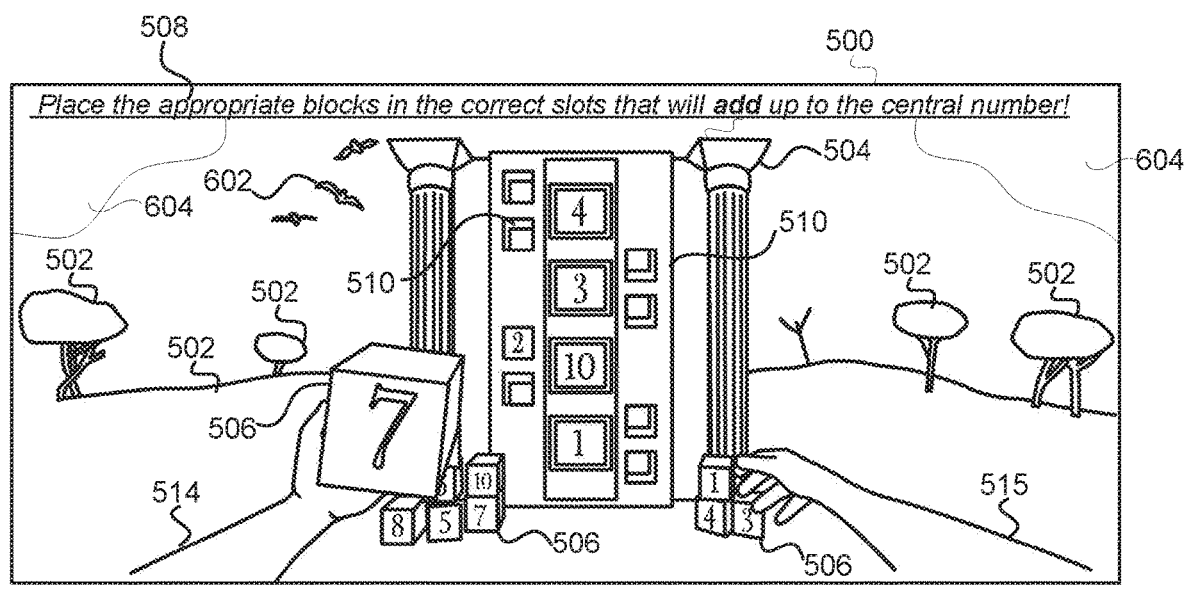
FIG. 6 illustrates an implementation of the lesson presented on a user interface of FIG. 5 depicting one or more modifications.

FIG. 5 and FIG. 6 depict an implementation of a user interface 500 depicting content associated with a lesson (e.g., a module and/or submodule). In particular, the user interface 500 depicts content demonstrating a concept of a larger number being broken down into smaller fragments, and/or other considerations. The educational content may be highlighted by a lesson portion 504, currently depicted as a wall (e.g., used to guide the users attention to the elements of the lesson associated with a particular topic, and/or other considerations). The lesson may include a display of background and/or foreground elements 502, currently depicted as trees and a hillside on a horizon. The user may be instructed 508 is to place the appropriate interface elements 506 (e.g., numbered blocks, and/or other considerations) in the correct slots 510 that will add up to the central number 512. Although the instructions 508 are currently depicted as written instructions, the instructions 508 may be provided in other ways (e.g., verbal, not provided at all, and/or other considerations). In this particular example, two slots 510 may be designated per respective central number 512, such that the lesson may teach the concept of adding two numbers to obtain a final sum, and/or other considerations. However, in other implementations, these and/or other features of the task may be changed or modified (e.g., to include three slots, four slots, five slots, and/or other considerations).

The user may interact with the user interface 500 via simulated left and right hand/arm portions (e.g., 514 and 515, respectively), and/or other considerations. Such interaction may be facilitated via a two handed controller included with and/or coupled to the computing platform (not shown), and/or other considerations. For example, the computing platform may include and/or may be adapted to include a left joystick with trigger for controlling the left hand 514 and/or a right joystick with trigger for controlling the right hand 515, and/or other considerations.

In the depiction in FIG. 5, at some point in time, the user may be instructed (e.g., via verbal instruction, written instruction, and/or other considerations) to use the right simulated hand portion 515 (e.g., via a right joystick, and/or other considerations) to place the appropriate interface elements 506 in the slots 510 on the right side of the wall, and/or other considerations. During this part of the lesson, the user may primarily utilize the left side of the brain for one or both of the mathematical cognition and the ancillary functions of vision and motor processing, and/or other considerations. The real time neural monitoring while the player is completing this task may reflect the primary and/or asymmetric activation of the left side of the brain, and/or other considerations. Benchmark studies using expert mathematicians may indicate a greater distribution of activity in specific regions of the right brain in addition to those of the left brain when solving mathematical problems. In order to elicit right brain activity, the lesson may be modified, as described in connection to FIG. 6.

In FIG. 6, non-educational content in connection with the lesson shown in the user interface 500 may be modified to elicit neural activation. For example, as currently depicted, the non-educational content may be modified and/or the user may be instructed to instead use the left hand 514 (e.g., via control of a left joystick, and/or other considerations) for completing the task(s) associated with the lesson, and/or other considerations. Based on this and/or other modifications, neural activation in right brain regions responsible for control of the left hand may be accomplished. As another illustrative example, one or more additional background and/or foreground interface elements 602, 604 not associated with the lesson's tasks may be introduced. For example, birds may be depicted to fly within the viewing area of the lesson; background imagery may be changed from "sunny" to "cloudy", and/or other considerations. In particular, the addition of transient interface elements 602 (e.g., birds, and/or other considerations) in the left upper quadrant of the user interface 500 may activate the right brain regions that may process visual information from the left visual field. Such modifications may be seamlessly integrated into the game play environment. Alone or in combination, these subtle modifications may result in a greater simultaneous activation of the right brain when learning mathematical concepts, which may primarily be a function of the left brain. The way in which modifications are determined and effectuated to alter the game environment may be used to activate specific brain functions. In particular, this elicited neural activation may be aimed to mimic target brain functions and/or particular activations (e.g., associated with "genius level" mathematical processing, and/or other considerations). Such target brain functions may involve the simultaneous activation of different brain regions, and/or other considerations.

It is noted that the implementation depicted in FIG. 5 and FIG. 6 is provided for illustrative purposes only and is not to be considered limiting. In other implementations, the mathematical concepts aimed to be taught in the lesson may be scaled for more or less advanced concepts in addition, subtraction, multiplication, division, and/or other considerations.

Figure 2:
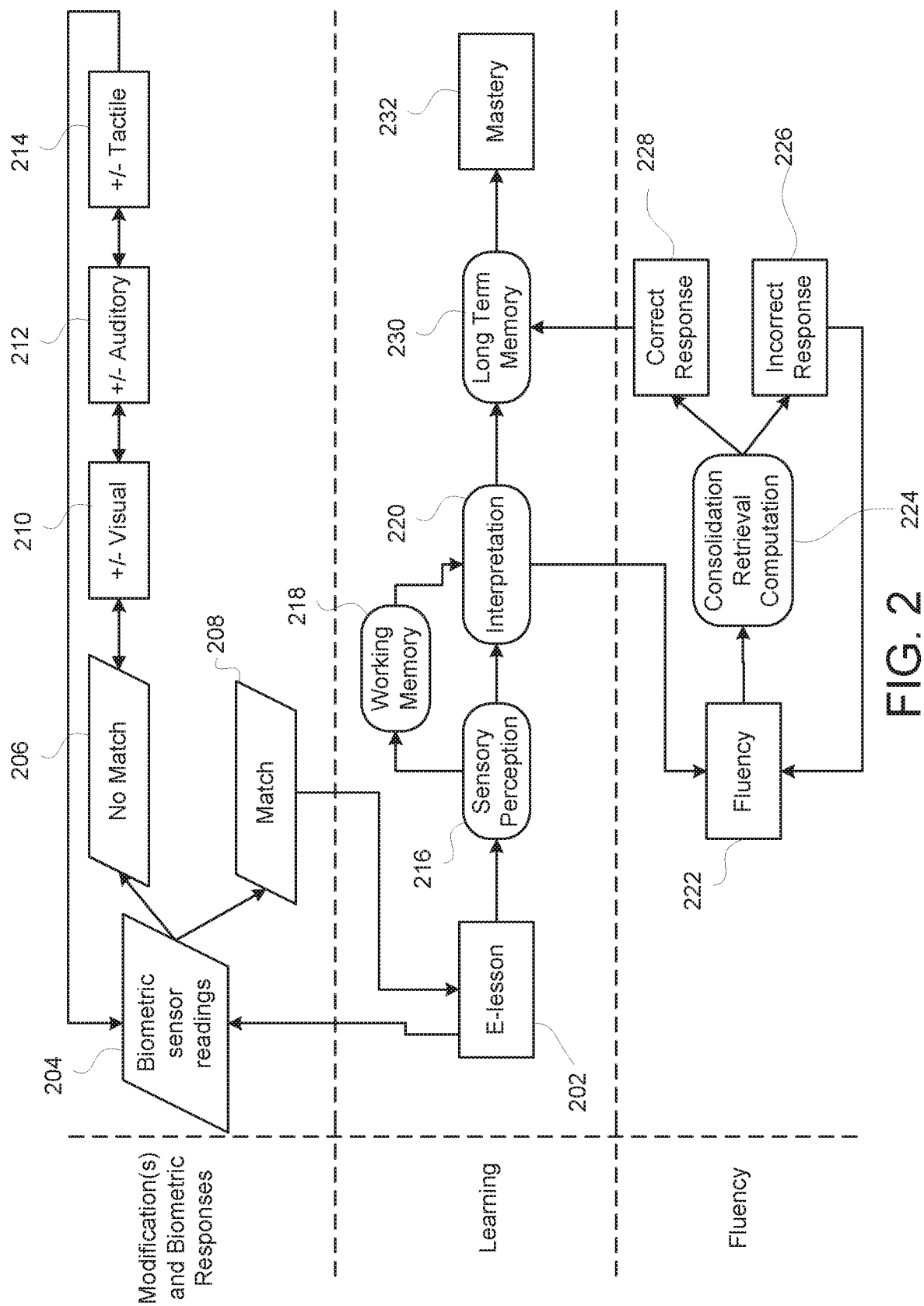
FIG. 2 illustrates a process flow diagram of the system of FIG. 1, in accordance with one or more implementations.

Referring now to the flow diagram shown in FIG. 2, an overview of one or more features and/or functions of the system 100 may be described. However, it is noted that a more detailed description of one or more features and/or functions of the system 100 may be described herein with reference made back to FIG. 1, as well as to FIG. 3, FIG. 4, FIG. 5, FIG. 6 and FIG. 7, wherein the computer program components and/or their functions may be described in more detail. With that being said, in FIG. 2, a user logs in and/or creates a profile to begin their participation in the interactive multimedia presentation at their respective client computing platform (not shown in FIG. 2). The user may encounter and/or otherwise start a lesson 202 for particular a skillset, and/or may participate in other portions of the interactive multimedia presentation. The user's initial participation in the lesson 202 may comprise a learning lesson (e.g., a submodule of the lesson 202), a fluency lesson 222, and/or other considerations.

During user interaction, the one or more biometric sensors (not shown in FIG. 2) included at or coupled to the client computing platform associated with the user may generate and/or record biometric sensor readings 204. In some implementations, the biometric sensor readings 204 may include brainwave activity readings and/or measurements, and/or other information. These readings may provide information related to a cognitive state of the user during a lesson and/or during a particular module and/or submodule of the lesson, and/or may provide other information. This information may be indicative of a particular engagement level of the user, a particular cognitive workload, specific brain region(s) that are activated (and/or patterns of activation), and/or other considerations. This information may be used to determine whether the user's pattern of brain activity matches 208 that of a predefined target, or does not match 206 as they are completing the lesson 202. Briefly, as describe herein, this determination may be based on a determination of a parameter value of a learning state parameter of the user, and/or other considerations. It is noted that the terms "attentive" and "disengaged" correspond to not only levels of user engagement (e.g., attention), but also with the levels and/or amount of cognitive workload, the specific brain activation regions and/or patterns, and/or other metrics that may be determined from the biometric sensor readings 204. For example, the user may be "disengaged" if the cognitive workload determined from the biometric sensor readings falls below a threshold and/or does not meet predetermined criteria, one or more specific brain regions do not activate or discontinue activation, and/or other considerations.

If a determination is made that the user's brain activation pattern does not match 206 that of the target learning state, then one or more modifications to the lesson 202 may be determined and subsequently effectuated. The modifications may include changes (depicted by the "+/−") to the visual component 210 of the lesson 202, the auditory component 212 of the lesson, the tactile component 214 of the lesson 202, and/or other changes and/or modifications. In some implementations, the changes may be made to the non-educational content of the lesson 202. In some implementations, the changes may be made to the educational content of the lesson 202. In some implementations, the changes may be made to both the educational and non-educational content of the lesson.

The information about the engagement level of the user, the cognitive workload, specific brain region(s) that are activated (and/or patterns of activation), and/or other aspects determined from the biometric sensor readings may be used as input variables to determine modifications to interactive multimedia presentation. These modifications may result in the presentation of key learning concepts while the user is in the target cognitive state related to attention, cognitive workload, brain activity, and/or receptivity of the user. If it is determined that the user is disengaged (e.g., through determinations of the parameter values of a learning state parameter for the user, described herein), by effectuating modifications to the components of the non-educational content (and/or educational content), some "level" of the user's attention, cognitive workload, and/or specific brain region activation can be elicited, describe in more detail herein. Thus, through this elicited neural activation, the user may be in better condition to learn and/or retain information. For example, this may include, but is not limited to, changing the background color, adding a sound, introducing a novel interaction, and/or other considerations.

The determination of modifications may be varied accordingly to provide target brain activation patters during the presentation of critical learning concepts and may be user dependent, and/or other considerations. By including multiple modifiable variables associated with the sensory (vision, hearing, taste, tactile, smell, and/or other considerations) and/or motor (interactivity, and/or other considerations) components, a high level of flexibility in changing these parameters may be provided. For example, not every user may neurologically respond the same to each modification. As such, the modifiable variables may be optimized for maximum effectiveness with each individual user over time. In addition, one or more components of the system may be configured to "learn" which modifiable variables are more or less effective for each individual user. The result may be a highly targeted approach that is unique to every individual user. The interactive multimedia presentation may then be presented to a user that creates custom lessons matched to each individual's particular neural predisposition, both spatially and temporally.

If a determination is made that the user's brain activation pattern matches 208 that of a predefined target state, the lesson and/or lesson module/submodule may progress and/or otherwise continue without additional modifications being made, and/or other considerations. In some implementations, the determination that the user's brain activation pattern matches 208 that of a predefined target state may be made after one or more modifications have been effectuated. In such implementations, the lesson and/or lesson module/submodule may continue with the current modification(s) continuing to be implemented. However, if at some subsequent time during the lesson, if the user's brain activation pattern no longer matches the target state (e.g., becomes suboptimal, and/or other considerations), then one or more additional modifications may be determined and effectuated. In some implementations, the type and/or quantity of modifications being effectuated may differ depending on the determined information associated with the biometric sensor readings 204.

As a lesson progresses, the content may become progressively more difficult, may include content that addresses variations of the particular skillset, may introduce new content, and/or may progress using one or more other teaching techniques. For example, a lesson may progress in difficulty based on one or more evaluation stages being implemented. These evaluation stages may evaluate sensory perception 216 of the user, the working memory 218 of the user, an interpretation 220 of the content by the user, the long term memory 230 of the user, and/or other considerations.

Through these and/or other evaluation techniques, the user may encounter, and/or may progress towards, one or more fluency portions 222 (e.g., a module/submodule of the lesson 202). In some implementations, the fluency portions 222 may include more direct question/answer type content, and/or other considerations. Recall that the learning portions of a lesson may include more instructive and/or guided content. Based on the user's participation in the fluency portion 222 (e.g., correct response(s) 228 and/or incorrect response(s) 226), and/or the impact of the fluency portion on the user (e.g., long term memory 230 and/or other considerations), a determination of the user's mastery 232 of the lesson 202 may be determined. In the figure, it is noted that element 224 may represent the internal brain processes that may take place in order for the user to assimilate a learned concept in relation to previous knowledge. The user may use that new learned concept in the context of that individual's generalized knowledge. This element may represent the inner workings of the brain during user's participation in the fluency portion 222. The result of those inner brain processes during the fluency portion 222 may result in either a correct or incorrect response (228, 226).

Returning to FIG. 1, the user component 106 may be configured to store, access, and/or manage one or more user profiles, user information, and/or user accounts associated with the users. The one or more user profiles and/or user information may include information stored locally to client computing platforms 120, by server 102, and/or other storage locations. The user profiles may include, for example, information identifying users (e.g., a username or handle, a number, an identifier, and/or other identifying information), security login information (e.g., a login code or password), account information, subscription information, virtual (or real) currency account information (e.g., related to currency held in credit for a user), control input information (e.g., a history of user inputs provided by the user), lesson participation histories (e.g., the lessons the users have completed, saved, and/or are currently completing, and/or other considerations), lesson plans for the users, saved progress information associated with the user participation in the interactive multimedia presentation, virtual inventory information (e.g., virtual inventories associated with the users that include one or more virtual items available to the users within the virtual space), relationship information (e.g., information related to relationships between users in the virtual space), virtual space usage information (e.g., a log-in history indicating the frequency and/or amount of times the user logs in to the user accounts), demographic information associated with user, information stated by users, browsing history of users, a client computing platform identification associated with a user, a phone number associated with a user, and/or other information related to users and/or user participation in the interactive multimedia presentation. As an illustrative example in FIG. 7, the user component 106 may be configured to manage a first user profile 702 associated with a first user (not shown).

Returning to FIG. 1, the presentation component 108 may be configured to effectuate presentation of the interactive multimedia presentation. The presentation component 108 may be configured to implement an instance of the interactive multimedia presentation (e.g., a virtual space) executed by the computer components to determine the state of the interactive multimedia presentation. The state may be communicated (e.g., via streaming visual data, via object/position data, and/or other state information) from server 102 to client computing platforms 120 for presentation to users. In implementations where the interactive multimedia presentation may be in the form of a game, the state determined and transmitted to a given client computing platform 120 may correspond to a view for a user character being controlled by the user via input devices at the given client computing platform 120. The state determined and presented to a given client computing platform 120 may correspond to a location in the virtual space (e.g., location in the game). The view described by the state for the given client computing platform 120 may correspond, for example, to the location from which the view is taken, the location the view depicts, and/or other locations, a zoom ratio, a dimensionality of objects, a point-of-view, and/or view parameters of the view. One or more of the view parameters may be selectable by the users.

An instance of the interactive multimedia presentation may comprise a simulated space that is accessible by users via clients (e.g., client computing platforms 120) that present the views of the interactive multimedia presentation and/or virtual space to a user. The simulated space may have a topography, express ongoing real time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which the state of the interactive multimedia presentation and/or virtual space is determined by presentation component 108 is not intended to be limiting. The presentation component 108 may be configured to express the interactive multimedia presentation and/or virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, education content, and/or other content) that describes particulars of the current state of the place, beyond the relatively generic graphics. For example, a view may include a generic landscape graphic with a textual description of the lesson overlaid thereon. Other expressions of individual places within the virtual space are contemplated.

Within the instance(s) of the interactive multimedia presentation and/or virtual space executed by presentation component 108, users may control game entities, simulated physical phenomena (e.g., wind, rain, earthquakes, and/or other phenomena), and/or other elements within the virtual space to interact with the interactive multimedia presentation. The game entities may include virtual characters such as avatars. As used herein, the term game entity may refer to an object (or group of objects) present in the virtual space that represents an individual user. The game entity may be controlled by the user with which it is associated. The user-controlled element(s) may move through and interact with the virtual space (e.g., non-user characters in the virtual space, user-selectable content associated with a particular lesson, other objects in the virtual space, and/or other considerations). The user may have an "inventory" of virtual items and/or currency that the user can use (e.g., by manipulation of a user character or other user-controlled element, and/or other items) within the virtual space. For example, the user may earn virtual currency based on their progress in a given lesson.

Figure 7:
FIG. 7 illustrates a server employed in the system of FIG. 1, in accordance with one or more implementations.

As an illustrative example in FIG. 7, the presentation component 108 may be configured to effectuate presentation of a first interactive multimedia presentation 704 to the first user. The first interactive multimedia presentation 704 may be associated with a first lesson 706, a first game 708, a first evaluation stage 710, and/or other information. The first lesson 706 may be includes content related to a first skillset the first user is learning (e.g., the educational content), and/or other considerations. The first lesson 706 may include a visual component, an auditory component, a tactile component and/or other component(s). The first lesson may include educational content and/or non-educational content.

Returning to FIG. 1, the sensor readings component 110 may be configured to obtain information related to biometric sensor readings of the users. The biometric sensor readings may be generated during presentation of the interactive multimedia presentation to the users via the associated client computing platforms 120. The obtained information may include descriptions of one or more cognitive states of the users during participation in the lessons, and/or other information. For example, the descriptions of the cognitive states of the user may be a description of a particular engagement level, a particular cognitive workload, specific brain region(s) that are activated (and/or patterns of activation), and/or other considerations. In some implementations, the obtained information may include the biometric sensor readings themselves and/or representations of the biometric sensor readings.

In some implementations, information related to the biometric sensor readings may be received from the client computing platforms 120. For example, the client computing platforms 120 may be configured to determine the descriptions of the cognitive states of the users, and/or other information. The biometric sensors 122 may generate readings and/or measurements at the client computing platforms 120 that include and/or otherwise determine brainwave activity in one or more regions of the user's brain, and/or other considerations. In particular, brainwave activity in the one or more regions of the user's brain that may be of interest may include one or more of alpha activity, beta activity, theta activity, gamma activity, other frequency and/or amplitude information, and/or considerations. The client computing platforms 120 may be configured to determine descriptions of the cognitive states of the users based on this measured activity and/or sensor readings. The client computing platforms 120 may be configured to communicate this determined information to the server 102 (e.g., sensor readings component 110) in real time, or near real time, as the information is being determined at the client computing platform 120.

In some implementations, the information related to the one or more biometric sensor readings may be determined by the sensor readings component 110 and/or other component(s) of the server 102. For example, the client computing platforms 120 may communicate in real time, or near real time, the recorded biometric sensor readings to the server 102 (e.g., sensor readings component 110 and/or other component). The sensor readings component 110 and/or other component may be configured to determine the cognitive states and/or other information based on the received biometric sensor readings. As such, in some implementations, the sensor readings component 110 may be configured to obtain the information related to the biometric sensor readings locally at the server 102.

In some implementations, the cognitive states and/or other information related to the biometric sensor readings may be determined using algorithms and/or other techniques that correlate biometric sensor readings to real world cognitive/mental activity. For example, an algorithm may use linear, quadratic, and/or discriminant function analysis in order to analyze EEG data (and/or other biometric sensor reading information) to make correlations to real-world cognitive/mental activity. In particular, a technique for determining information related to cognitive workload may include measuring an increase in frontal theta activity coupled with a decrease of temporal-occipital alpha activity, and/or other considerations. A technique to determine attention or engagement may be to measure beta amplitude divided by alpha+theta amplitude, and/or other considerations. Spatial activation mapping of particular brain regions may be accomplished through one or more known techniques, and/or other considerations.

As an illustrative example, in FIG. 7, the sensor reading component 110 may be configured to obtain first information 712 from the client computing platform (not shown) associated with the first user (not shown). The first information 712 may include first biometric sensor readings 714 that are recorded and/or generated at the client computing platform and/or other considerations. The first information 712 may include a first description of a first cognitive state 716 of the first user during participation in the first lesson 706, and/or other considerations. The first information 712 may include a second description of a second cognitive state 718 of the first user during participating in the first lesson 706 and/or other considerations. In some implementations, the second cognitive state 718 may be a cognitive state of the user that was temporally after the first cognitive state of the first user during the first lesson 706. The first information 712 may include other information.

Returning to FIG. 1, learning parameter component 112 may be configured to determine parameter values associated with a learning state parameter of the users while the users are participating in one or more lessons. As described herein, the learning state parameter of a user may be indicative of the state of the user's attention level, cognitive workload, specific brain region activation, and/or aspect. In some implementations, the determined parameter value may convey whether or not the user's attention level, cognitive workload, specific brain region activation, and/or other aspect are at the target state for learning.

In some implementations, the target states may be derived from biometric sensor readings of control users that have participated in, or are participating in, the interactive multimedia presentation. The control users may be experts that demonstrate mastery of the content (e.g., the skillset) presented in the interactive multimedia presentation, and/or other considerations. As such, it may be a goal of the present disclosure to elicit specific brain activation in the users through modifications of the interactive multimedia presentation that drive neuroplasticity such that the user's brain activity may match that of the expert. The target states may be considered "cognitive criteria", and/or other considerations.

In some implementations, the learning parameter component 112 may be configured to determine the one or more parameter values based on comparisons between the cognitive states of the user and the predetermined cognitive criteria. In some implementations, the parameter values may be determined in real time, or near real time, as the user interacts with a particular lesson, a portion of a particular lesson (e.g., a module/submodule), and/or other considerations. As such, the real time or near real time brainwave activity may be compared and/or otherwise evaluated against the cognitive criteria for each lesson and/or for different modules/submodules of each lesson. The comparison and/or evaluation may include mapping a difference between one or more of the attention, cognitive workload, spatial activation, and/or other aspect of to the user's cognitive state and the cognitive criteria (e.g., the attention level, cognitive workload, spatial activation, and/or other aspect of to the control user's cognitive state, and/or other considerations), and/or may include one or more other evaluations and/or comparisons.

The parameter value(s) may be a qualitative and/or quantitative description of these comparisons. For example, the parameter values may convey whether or not a cognitive state of the user matches the predetermined cognitive criteria. As an illustrative example, a parameter value may be a numerical value that "scores" the relative match between the user's cognitive state and the cognitive criteria. This may include a percentage (e.g., 60% match and/or other consideration), a fraction (e.g., ⅔ match and/or other considerations), a rank on a scale (e.g., 4 out of 10 and/or other considerations), and/or other numerical value that conveys whether or not a cognitive state of the user matches the predetermined cognitive criteria. In some implementations, the parameter value may be qualitative. For example, the parameter value may be "Match", "Adequate match", "Perfect match", "No match", "Close Match", and/or other considerations. It is noted that the above examples are provided for illustrative purpose only and are not intended to be limiting. In other implementations, the parameter values may be determined and/or may be represented in other ways.

In some implementations, the parameter values may be determined based on comparisons of engagement level, cognitive workload, brain region activation, and/or other aspect, between the users and the expert(s). In some implementations, different parameter values may be determined separately for each aspect. In some implementations, a single parameter value may be determined based on the aggregate of the comparisons for each of the aspects. For example, if a majority of the comparisons convey a positive match, then it may be determined overall that the user's cognitive state matches that of the expert and is in the target learning state.

As an illustrative example in FIG. 7, the learning parameter component 112 may be configured to determine and/or otherwise store first cognitive criteria 720. The first cognitive criteria 720 may be associated with the first lesson 706, and/or a portion thereof. The learning parameter component 112 may be configured to determine a first parameter value 722, and/or other considerations. The first parameter value 722 may be determined based on a comparison between the description of the first cognitive state 716 of the user and the first cognitive criteria 720. The learning parameter component 112 may be configured to determine a second parameter value 724. The second parameter value 724 may be determined based on a comparison between the description of the second cognitive state 718 and the first cognitive criteria 720. The learning parameter component 112 may be configured to determine other parameter values based on the first cognitive criteria 720 and/or other cognitive criteria.

Returning to FIG. 1, the modification component 114 may be configured to determine one or more modifications to the interactive multimedia presentation based on the determined parameter value(s). The modification component 114 may be configured to subsequently effectuate the determined one or more modifications. For example, the modifications may be effectuated at the server 102 and pushed to the client computing platforms 120. In some implementations, the modifications may be effectuated at the client computing platforms 120, and/or other considerations. In some implementations, the modifications may be for the non-educational content only, and/or other considerations. In other words, the modifications may be effectuated independently from the educational content of the lessons. In some implementations, the modification component may be configured to determine, based on the determined parameter values, that no modifications should be effectuated (e.g., the user is in the target state).

The determination of the modifications based on the parameter value(s) may be associated with eliciting a cognitive state that may be lacking and/or underperforming in the user. For example, if a parameter value conveys that the attention level of the user does not match that of the expert, then a modification that elicits brain activity related to attention (e.g., alpha, beta, and/or theta activity) may be specifically determined and subsequently effectuated. As another example, if a parameter value conveys that one or more specific brain regions activated in the expert are not activated in the user, then a modification that elicits brain activity in that region may be determined and subsequently effectuated. Determinations of modifications may be considered in other ways.

In particular, modifications to one or more of the visual component, auditory component, and/or tactile component related to non-educational (and/or educational) content may be of particular interest. For example, modifications to a visual component may activate the motion detection pathway of the visual system and/or other portions of the brain. As an illustrative example referring back to FIG. 4, such a modification may include transitioning the interface elements 406 from static objects to rotating ones, and/or other considerations. By doing this, the interactive multimedia presentation may draw the user's attention to the elements 406. Similarly, by changing the background foliage elements 402 from static to moving, the interactive multimedia presentation engages the user and draws their focus back to the user interface 400.

Modifications to the auditory component may activate the auditory pathway, and/or other portions of the brain. Such modifications may include changing and/or providing background music and/or sounds, and/or other considerations. Such modifications may be effective in drawing the user's attention to the user interface 400.

Modifications to the tactile component may activate the tactile sensory pathway and/or other portions of the brain. Such modifications may increase the user's interaction with a scene, and/or other considerations. For example, a lesson may direct the user to physically select an interface element 406 (and/or other target object) with their fingertips as opposed to using other input methods. Another modification may include altering and/or changes the intensity of a tactile response provided by the client computing platform (e.g., a vibration). In some implementations, the user may be directed to use a particular finger and/or hand when making selections, and/or other considerations. For example, the hand used to choose a target object on the screen may be varied to specifically activate one side of the brain vs. the other.

As such, the provision of multiple modifiable variables that may activate different sensory systems (vision, hearing, kinesthetic, and/or other considerations) may provide multiple tools to modulate attention, cognitive workload, special activation, and/or other aspect during the course of the lesson and may be used to avoid habituation associated with using the same stimulus repeatedly. One or more of the modifiable components may be determined to elicit greater responses than others. The modification component 114 may be configured to determine how different people may react differently to different modifications. Over time the modification component 114 may "learn" which components may be more or less effective for any given user and may modify the interactive multimedia presentation accordingly. It may be of a particular advantage in that multiple modifiable components may be included, all of which can be altered to achieve the goal of focused attention and activation of target brain areas, in a seamless, unobtrusive manner as a background process while the user is interacting with a lesson, playing a game, and/or otherwise participating in the interactive multimedia presentation.

As an illustrative example in FIG. 7, the modification component 114 may be configured to determine a first modification 726 to the first lesson 706 and effectuate the first modification 726 to the first lesson 706 responsive to the determined first parameter value 722 conveying that the first cognitive state 716 of the first user does not match the first cognitive criteria 720, and/or other considerations. In some implementations, the modification component 114 may be configured to, responsive to the determined second parameter value 724 conveying that the second cognitive state 718 of the first user does match the first cognitive criteria 720 of the first lesson 706, determine that no further modifications to the first lesson 706 are to be effectuated.

Returning to FIG. 1, the evaluation component 116 may be configured to evaluate the user's learning progress, and/or other considerations. In some implementation, evaluating the user's learning progress may include implementing one or more evaluation stages into the interactive multimedia presentation at various stages. These evaluation stages may include games, mini-games, exercises, question and answer portions, simulated exploratory learning environments, and/or other considerations. An initial evaluation stage may be implemented at the beginning of a lesson and/or the interactive multimedia presentation to determine a base knowledge level of the user prior to the start of the lesson, and/or other considerations. Evaluation stages may be implemented periodically during the presentation of the interactive multimedia presentation. The evaluation states may be employed to determine progressive knowledge levels related to the user's ongoing comprehension of the specific concept and/or skillset being taught.

In some implementations new or different educational content may be specifically presented in the evaluation stages to "fill in" any missing concepts and/or skillsets, advance the user's learning progress for a particular concept, and/or create a new learning challenge for the user. In some implementations, the evaluation states may evaluate and/or address metrics such as: latency to respond to questions; accuracy of responses; time until target comprehension; and/or other metric. The metric may be associated with a single presentation and/or varied presentations (e.g., with one or more of visual emphasis, auditory emphasis, kinesthetic emphasis, and/or other emphasis).

As an illustrative example in FIG. 7, the evaluation component 116 may be configured to determine a first evaluation 728 of the first user. The first evaluation may be determined based on effectuating a first evaluation stage (not shown) into the first lesson 706. For example, the first evaluation state may be implemented midway through the first lesson 706 and/or other one or more other times.

Figure 3:
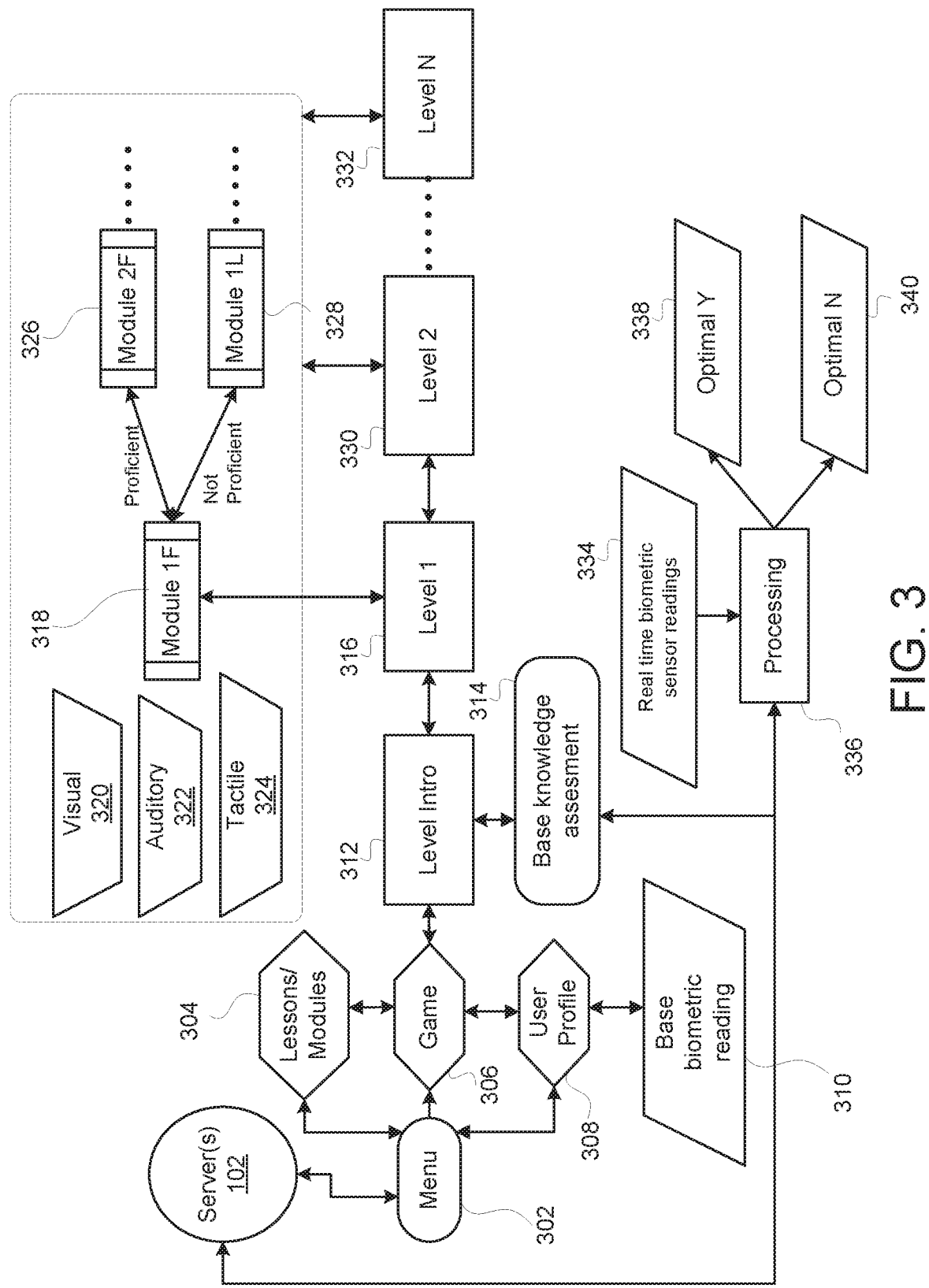
FIG. 3 illustrates another process flow diagram of the system of FIG. 1, in accordance with one or more implementations.

Referring now to the flow diagram in FIG. 3, an exemplary implementation of the system 100 which incorporates one or more of the features described above is provided. It is noted that the following description is intended to be illustrative. In addition, although specific reference to the computer program component may not be provided in the following description, this is not to be considered limiting. For example, the following features and/or functions described herein may correspond to any one (or more) of the computer program components describe above, as may become apparent upon reading.

With that being said, in FIG. 3, an exemplary implementation of the interactive multimedia presentation is described. The user (not shown) may access the server 102 via a client computing platform. The user may access a menu 302 of options pertaining to the system 100 and/or interactive multimedia presentation. The user may log in. In some implementations, if the user is a returning user, then the menu 302 may provide the user with the option to start where the user previously left off, start a new lesson, and/or other considerations. In some implementations, if the user is a new user, the user may be prompted to set up a user profile 308.

During the user profile 308 setup, a baseline biometric reading 310 (e.g., EEG and/or other reading) may be recorded. The baseline reading 310 may be provided by instructing the user to, for example, close their eyes and/or remain relaxed for 30 seconds (or other time period). The baseline biometric readings 310 may also include instructing the user to perform one or more concentrated activities, rudimentary tasks, and/or other considerations. Next, an assessment of learning style preference may be determined through one or more interactive exercises presented to the user, described below.

As an illustrative example, in some implementations these assessment-type interactive exercises may include simple questions that may relate to the game play environment. This may include questions regarding virtual items the user may need and/or use during participation in the game, and/or other considerations. For example, if the game is an adventure game, a question may include 'How much rope should we put in our adventure pack?', and/or other considerations. In some implementation, the assessment-type interactive exercises may involve the subject reading one or more questions from written text while listening to the question as non-player character in the game verbally asks them. In some implementations, a more interactive format may include the subject performing some action in order to reveal the question. In some implementations, a question may be provided by a visual representation of the question (e.g., as opposed to displayed text). In some implementations, a character in the game may present the question in a melodic or musical manner, and/or other considerations. The subject may then provide answer(s) to presented question(s).

An initial assessment may run through a series of such questions to ascertain a base learning preference for the subject. This may provide a starting point based on response latency, accuracy, and/or other considerations. The learning style of the subject may be continually tested by varying presentations and question types throughout learning and/or fluency modules. The information gathered from this testing may be compared to real time neural assessment, in order to create a learning specific profile that improves in accuracy with the continued use of the program. This may serve as a starting point for the game to present the learning and interactivity in the manner that promotes the highest level of learning efficiency for that particular individual.

After the user has set up a user profile 308, or if a returning user, a selection of a new lesson/module(s) 304, game(s) 306, and/or other selections may be made from this menu 302. As describe herein, lessons may provide a larger learning category (e.g., mathematical lessons, reading lessons, language lessons, age-appropriate lessons, and/or other considerations). This may include, "Addition of numbers to 10", and/or more or less complex mathematical lessons. Modules may be subcategories within lessons that break down the lesson into different targeted concepts that build to teach the lesson.

In some implementations, games 306 may be selected. The games 306 may, at some level, incorporate the educational content that is associated with the lessons/modules 304, however, within the bounds of a game and/or game mechanics. For example, any lesson/module and/or content thereof may be loaded into a game. This may include designing the game in isolated parts that can then be assembled in various combinations to achieve the desired result, and/or other considerations. In particular, a game may be broken up into a level intro 312 and subsequent levels 316, 330, and 332 (e.g., levels 1-N, respectively).

The level intro 312 may include an introductory portion of the game 306. The level intro 312 may be used to familiarize the user with game controls, game mechanics, and/or other considerations. This may include movement of an avatar, interaction, and/or other considerations.

In some implementations, the user's level of baseline knowledge 314 about a particular topic/skillset may be determined through embedded tasks in the introductory portion of the game 306. This information may be used to generate the initial instructional lesson (e.g., the first level 312) for a topic/skillset with the appropriate module(s). If more background information is required before introducing a new topic/skillset, the level intro 312 and/or first level 316 may be automatically configured to include the appropriate module(s) that may be used to teach the prerequisite skills.

In the first level 316, a first gameplay setting may be established. The modules may be loaded from the server 102 and integrated seamlessly into the game play environment. In some implementations, gameplay may include navigating through an environment and/or passing certain challenges in order to make it through.

Each module may comprise an interactive instructional portion that teaches a concept and/or skillset. An example of a module may be, for example, adding the number "1" to numbers "1" through "9" to see the pattern of the summations. The tools used for such a module may include interface elements with which the user interacts. For example, the module may show a group of "x" objects, with one or more extra objects nearby. The user may be instructed to "drag" an extra object into the group of "x" objects and demonstrate, by visual and auditory cues, that the new group contains "x+1" objects.

Modules may be categorized as "L" for learning or "F" for fluency, as depicted in the flow diagram. Again, learning modules may be more instruction-based with explanations and work through examples of a topic. Fluency modules may come before and/or after the learning modules and/or may be used to demonstrate proficiency with that topic. Integration of any of the modules into a game may be accomplished by including a basic game framework that can "plug" the modules into various parts of the game. The appropriate art assets, background and/or other components, may be interchangeable, but the framework may maintain the particular action or task of the gameplay.

As an illustrative example, a fluency module, "Module 1F" 318 is shown in connection to the first level 316. During gameplay, the challenges for the gameplay advancement may integrate the questions/tasks/problem-solving of Module 1F 318. Various interactive video) preset action sequences gameplay (e.g., arcade style, role playing, and/or other considerations) and/or challenges may be loaded in any set of modules to practice a particular skillset (addition, subtraction, multiplication, and/or other considerations). These modules promote consolidation from short term memory into long term memory for mathematical topics and/or other topics.

In some implementations, if the user does not pass a preset number of questions and/or attempts, then the presentation may switch to a learning module (Module 1L 328). Module 1L 328 may be slower paced, instruction-based learning environments. The learning modules may include a virtual instructor that teaches the content through interactive exercises, and/or other considerations.

In one or more aspects of gameplay, the user may be required to solve problems, complete tasks, and/or perform actions in order to advance levels or continue play in the games. The time to respond to questions (speed), whether the question is answered correctly or incorrectly (accuracy), and/or other metrics associated with user interaction may be recorded and saved (e.g., in their profile). Once a user has been determined to have "mastered" a topic and/or skillset presented in module, the user may be advanced to the subsequent levels 330 to 332, and accompanying modules (e.g., second level 330 accompanying Module 2F 326). In a mathematics example, the proficiency of the user in single digit addition may be determined by measuring the speed and/or accuracy prior to advancing the questions to double digit addition, and/or may be advanced based on determinations of parameter values of a learning state parameter of the user, as described herein. In some implementations, the evaluations may be used to evaluate the effectiveness of one or more modifications that may have been effectuated in the interactive multimedia presentation (e.g., to determine if a change in background color has in fact helped the user get into the target learning state, and/or other considerations). The evaluations may be used to trigger different or other modifications.

While the user is playing the game, biometric sensor readings 334 may be recorded and/or generated in real time or near real time. The biometric sensor readings and/or information related to the biometric sensor readings may be obtained by the server 102. Using one or more of the techniques presented herein, the biometric sensor readings and/or information related to the biometric sensor readings may be processed 336 to determine if the player is attentive, their cognitive workload, which areas of the brain are active, and/or other considerations.

In some implementations, the biometric sensor readings and/or related information convey whether or not there is a match of the user's cognitive state(s) with predetermined cognitive criteria. If a match is determined, then the user may be deemed to be in the target learning state (e.g., as compared to target criteria 338 and/or 340). The modules may continue unchanged.

In some implementations, if the biometric sensor readings and/or related information convey that there is not a match with the predetermined cognitive criteria, then the modules may be modified. The modifications may elicit brain responses such that the user may then match the target learning state (e.g., as conveyed by target criteria 338 and/or 340). A modification may comprise one or more changes to any one or more of the visual component 320, auditor component 322, tactile component 324, and/or other component of the interactive multimedia presentation. In some implementation, the modification may be effectuated independently from the educational content.

Returning to FIG. 1, the server 102, client computing platforms 120, and/or external resources 124 may be operatively linked via one or more electronic communication links. For example, such electronic communication links may be established, at least in part, via network 118 such as the Internet and/or other networks, near field communication, Bluetooth®, and/or Wi-Fi. It will be appreciated that this is not intended to be limiting, and that the scope of this disclosure includes implementations in which servers 102, client computing platforms 120, and/or external resources 124 may be operatively linked via some other communication media.

The external resources 124 may include sources of information, hosts and/or providers of information outside of system 100, external entities participating with system 100 (e.g., cloud storage), and/or other resources. In some implementations, some or all of the functionality attributed herein to external resources 124 may be provided by resources included in system 100.

The server 102 may include electronic storage 117, one or more processors 104, and/or other components. The server 102 may include communication lines, or ports to enable the exchange of information with a network and/or client computing platforms. Illustration of server 102 in FIG. 1 is not intended to be limiting. The server 102 may include a plurality of hardware, software, and/or firmware components operating together to provide the functionality attributed herein to the server 102. For example, server 102 may be implemented by a cloud of computing platforms operating together as server 102.

Electronic storage 117 may comprise electronic storage media that electronically stores information. The electronic storage media of electronic storage 117 may include one or both of system storage that is provided integrally (i.e., substantially non-removable) with server 102, and/or removable storage that is removably connectable to server 102 via, for example, a port (e.g., a USB port, a firewire port, etc.) or a drive (e.g., a disk drive, etc.). Electronic storage 117 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 117 may include one or more virtual storage resources (e.g., cloud storage, a virtual private network, and/or other virtual storage resources). Electronic storage 117 may store software algorithms, information determined by processors 104, information received from client computing platforms 120, and/or other information that enables server 102 to function as described herein.

Processor(s) 104 is configured to provide information processing capabilities in server 102. As such, processors 104 may include one or more of a digital processor, an analog processor, a digital circuit designed to process information, an analog circuit designed to process information, a state machine, and/or other mechanisms for electronically processing information. Although processors 104 are shown in FIG. 1 as a single entity, this is for illustrative purposes only. In some implementations, processor 104 may include one or more processing units. The processing units may be physically located within the same device, or processor 104 may represent processing functionality of a plurality of devices operating in coordination.

The processor 104 may be configured to execute components 106, 108, 110, 112, 114, and/or 116. Processor 104 may be configured to execute components 106, 108, 110, 112, 114, and/or 116 by software; hardware; firmware; some combination of software, hardware, and/or firmware; and/or other mechanisms for configuring processing capabilities on processor 104. It should be appreciated that although components 106, 108, 110, 112, 114, and/or 116 are illustrated in FIG. 1 as being co-located within a single processing unit, in implementations in which processor 104 includes multiple processing units, one or more of components 106, 108, 110, 112, 114, and/or 116 may be located remotely from the other components. The description of the functionality provided by the different components 106, 108, 110, 112, 114, and/or 116 described above is for illustrative purposes and is not intended to be limiting, as any of components 106, 108, 110, 112, 114, and/or 116 may provide more or less functionality than is described. For example, one or more of components 106, 108, 110, 112, 114, and/or 116 may be eliminated, and some or all of its functionality may be provided by other ones of components 106, 108, 110, 112, 114, 116, and/or other components. As another example, processor 104 may be configured to execute one or more additional components that may perform some or all of the functionality attributed below to one of components 106, 108, 110, 112, 114, and/or 116.

Figure 8:
FIG. 8 illustrates a method of customizing an interactive multimedia presentation, in accordance with one or more implementations.

FIG. 8 depicts a method 800 of customizing an educational interactive multimedia presentation. The operations of the method 800 presented below are intended to be illustrative. In some implementations, the method 800 may be accomplished with one or more additional operations not described, and/or without one or more of the operations discussed. Additionally, the order in which the operations of method 800 described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

Referring now to a method 800 in FIG. 8, at an operation 802, an educational interactive multimedia presentation may be presented to a user. The presentation to the user may be effectuated via a client computing platform associated with the user. The user may participate in the interactive multimedia presentation through input facilitated through entry and/or selection by the user via the client computing platform. The interactive multimedia presentation may be associated with one or more educational lessons. In some implementations, operation 802 may be performed by a presentation component the same as, or similar to, presentation component 108 (shown in FIG. 1 and described herein).

At an operation 804, information related to recorded biometric sensor readings of the user may be obtained. The biometric sensor readings may be recorded during presentation of the interactive multimedia presentation to the user. The information may include a description of a first cognitive state of the user during the participation in a first lesson. In some implementations, operation 804 may be performed by a sensor readings component the same as or similar to the sensor readings component 110 (shown in FIG. 1 and described herein).

At an operation 806, a parameter value associated with a learning state parameter of the user may be determined. The parameter value may be determined while the user is participating in the first lesson. The parameter value may be determined based on a comparison between the first cognitive state of the user and predetermined cognitive criteria for the first lesson. In some implementations, operation 806 may be performed by a learning parameter component the same as or similar to learning parameter component 112 (shown in FIG. 1 and described herein).

At an operation 808, one or more modifications to the first lesson may be determined. The one or more modifications may be determined based on the determined parameter value. The one or more determined modifications may be effectuated. The one or more modifications may include a change to one or more of a visual component, an auditory component, a tactile component, and/or other component of the first lesson. The one or more modifications may elicit a change in the cognitive state of the user. The one or more modifications to the first lesson may be independent from the content related to a first skillset presented in the first lesson. For example, responsive to the determined parameter value conveying that the first cognitive state of the user does not match the predetermined cognitive criteria, a first modification to the first lesson may be determined. In some implementations, operation 808 may be performed by a modifications component the same as or similar to modifications component 114 (shown in FIG. 1 and described herein).

Although the present technology has been described in detail, for the purpose of illustration, based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A non-transitory machine-readable storage medium encoded with instructions executable by one or more physical processors, the machine-readable storage medium comprising instructions to cause the one or more physical processors to:

obtain information related to brain activity readings of a user during interaction by the user with an interactive multimedia presentation, the interactive multimedia presentation comprising a lesson, the lesson including content corresponding to a predetermined skillset;

retrieve stored information describing a target brain activity for the user during the interaction with the interactive multimedia presentation;

retrieve stored information conveying known levels of brain activation that are elicited for one or more brain regions in the user based on content not related to the predetermined skillset being presented to the user in isolation;

compare the information related to the brain activity readings of the user and the information describing the target brain activity readings;

implement, based on the comparison, a modification to the lesson to attempt to passively elicit, from the user, brain activity that corresponds to the target brain activity, wherein the modification does not affect the content of the predetermined skillset, and wherein the modification includes the content not related to the predetermined skillset that elicits known levels of brain activity in one or more brain regions in the user that correspond to the target brain activity.

2. The non-transitory machine-readable storage medium of claim 1, wherein the information describing the target brain activity is information related to brain activity readings of a second user occurring during a prior interaction by the second user with the first lesson.

3. The non-transitory machine-readable storage medium of claim 2, wherein the second user is known to be proficient in the predetermined skillset.

4. The non-transitory machine-readable storage medium of claim 1, wherein the information describing the target brain activity is information related to brain activity readings of a second user occurring during a concurrent interaction by the second user with the first lesson.

5. The non-transitory machine-readable storage medium of claim 4, wherein the second user is known to be proficient in the predetermined skillset.

6. The non-transitory machine-readable storage medium of claim 1, wherein the information describing the target brain activity is information related to brain activity readings of the user occurring during a prior interaction by the user with the first lesson.

7. The non-transitory machine-readable storage medium of claim 1, wherein the information describing the target brain activity is information related to brain activity readings of a group of users occurring during a prior interaction by the group of users with the first lesson.

8. The non-transitory machine-readable storage medium of claim 1, wherein the content not related to the predetermined skillset presented to the user in isolation includes one or more of a background color, a foreground color, a brightness, imagery, motion, music, a sound, or tactical content.

9. The non-transitory machine-readable storage medium of claim 1, wherein the lesson includes games.

10. The non-transitory machine-readable storage medium of claim 1, wherein the content not related to the predetermined skillset presented to the user in isolation is categorized based on levels of neuroplasticity elicited in the user.

11. A method comprising:

obtaining information related to brain activity readings of a user during interaction by the user with an interactive multimedia presentation, the interactive multimedia presentation comprising a lesson, the lesson including content corresponding to a predetermined skillset;

retrieving stored information describing a target brain activity for the user during the interaction with the interactive multimedia presentation;

retrieving stored information conveying known levels of brain activation that are elicited for one or more brain regions in the user based on content not related to the predetermined skillset being presented to the user in isolation;

comparing the information related to the brain activity readings of the user and the information describing the target brain activity readings;

implementing, based on the comparison, a modification to the lesson to attempt to passively elicit, from the user, brain activity that corresponds to the target brain activity, wherein the modification does not affect the content of the predetermined skillset, and wherein the modification includes the content not related to the predetermined skillset that elicits known levels of brain activity in one or more brain regions in the user that correspond to the target brain activity.

12. The method of claim 11, wherein the information describing the target brain activity is information related to brain activity readings of a second user occurring during a prior interaction by the second user with the first lesson.

13. The method of claim 11, wherein the second user is known to be proficient in the predetermined skillset.

14. The method of claim 11, wherein the information describing the target brain activity is information related to brain activity readings of a second user occurring during a concurrent interaction by the second user with the first lesson.

15. The method of claim 11, wherein the second user is known to be proficient in the predetermined skillset.

16. The method of claim 11 wherein the information describing the target brain activity is information related to brain activity readings of the user occurring during a prior interaction by the user with the first lesson.

17. The method of claim 11, wherein the information describing the target brain activity is information related to brain activity readings of a group of users occurring during a prior interaction by the group of users with the first lesson.

18. The method of claim 11, wherein the content not related to the predetermined skillset presented to the user in isolation includes one or more of a background color, a foreground color, a brightness, imagery, motion, music, a sound, or tactical content.

19. The method of claim 11 wherein the lesson includes games.

20. The method of claim 11, wherein the content not related to the predetermined skillset presented to the user in isolation is categorized based on levels of neuroplasticity elicited in the user.

* * * * *